(12) United States Patent
Tribble et al.

(10) Patent No.: US 11,169,725 B1
(45) Date of Patent: Nov. 9, 2021

(54) SYSTEM FOR PROCESSING OF LOG DATA IN MEMORY

(71) Applicant: AMAZON TECHNOLOGIES, INC., Seattle, WA (US)

(72) Inventors: Alex Jennifer Tribble, Seattle, WA (US); Anil Gangolli, Palo Alto, CA (US); Robert James Hanson, Renton, WA (US); Mohsen Azimi, Seattle, WA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 48 days.

(21) Appl. No.: 16/711,275

(22) Filed: Dec. 11, 2019

(51) Int. Cl.
*G06F 3/06* (2006.01)
*G06F 16/17* (2019.01)

(52) U.S. Cl.
CPC .......... *G06F 3/0647* (2013.01); *G06F 3/0611* (2013.01); *G06F 3/0679* (2013.01); *G06F 16/1734* (2019.01)

(58) Field of Classification Search
CPC .. G06F 3/0647; G06F 16/1734; G06F 3/0611; G06F 3/0679

USPC ......................................................... 711/154
See application file for complete search history.

(56) References Cited

U.S. PATENT DOCUMENTS

2012/0317382 A1* 12/2012 Steed .................. G06F 11/1441
711/162

\* cited by examiner

*Primary Examiner* — Gautam Sain
(74) *Attorney, Agent, or Firm* — Lindauer Law, PLLC

(57) ABSTRACT

To reduce the time, cost, and computational resources associated with writing to and reading from a non-volatile memory device multiple times, log data is stored in volatile memory of a computing device. The host device includes a file system that receives the log data from an application when the application sends an instruction to write the log data to the file system. Once the log data is stored in volatile memory, device data indicative of the rate at which log data is received by and transmitted from the computing device, and an amount of unused memory or other computational resources of the computing device, may be used to determine which services are permitted to access the log data, and whether to provide access to all of the log data or only a portion of the log data based on a sampling rate.

20 Claims, 7 Drawing Sheets

SYSTEM FOR PROCESSING OF LOG DATA IN MEMORY

BACKGROUND

Log data that is generated by applications and stored in data storage is often subsequently accessed by multiple services for various purposes, such as generation of metric data, determination of errors, determination of user interactions, or compression and archival. Processing of a single log by multiple services may involve writing the log to a disk and reading the log from the disk multiple times, which may result in a significant cost, use of time, and use of computational resources associated with input and output (I/O) operations for the disk.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
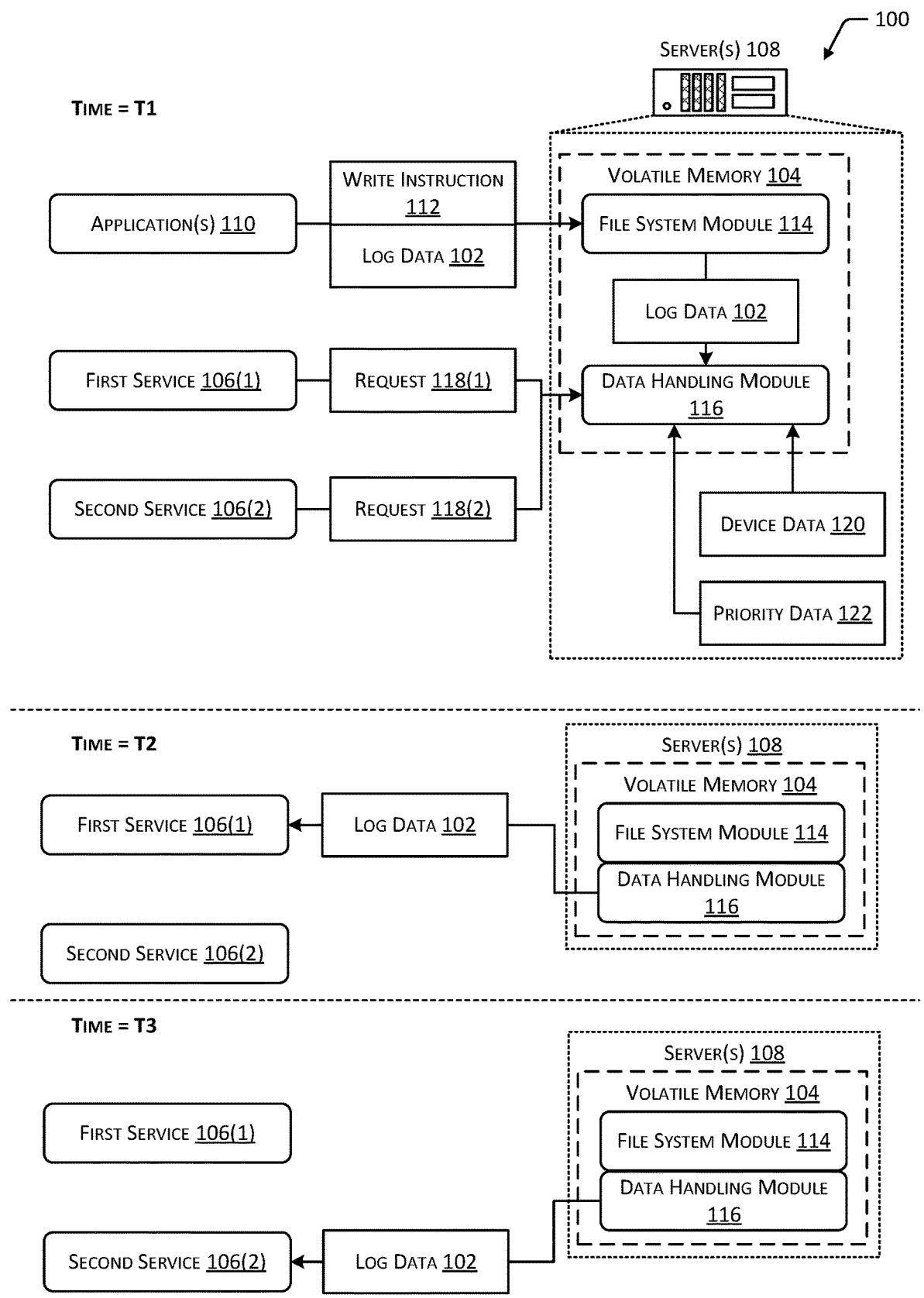
FIG. 1 depicts an implementation of a system for receiving and storing log data in volatile memory for access by multiple services.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Various types of data, such as log data, may be processed by multiple services after the data is initially received and stored. For example, log data that is generated by an application may be received by a host device, such as a server or other type of computing device, and written to non-volatile data storage, (e.g., a disk, such as a hard drive, solid state drive, and so forth). This data may then be accessed by other processes or services, which may read the data into memory for a variety of purposes, such as generating metric data, determining the presence of errors, transmitting portions of the data to other devices for use, compression of the data, archival of the data, and so forth. When each of these functions is performed by a separate process, this may result in a single log file being read from and written to a non-volatile memory device many times. These frequent input and output (I/O) operations may inefficiently consume computational resources and reduce the resources available for other tasks. Additionally, during times of significant traffic to the host device or frequent access to the data storage, the resources used by other tasks may delay performance of the I/O operations.

Described in this disclosure are techniques to reduce the computational cost associated with accessing of the same data by multiple processes by storing the data in volatile memory and enabling multiple processes to access the data within the volatile memory without writing the data to non-volatile memory. As a result, the processes that access the data are not required to read the data from or write data to a non-volatile memory device. A volatile memory device may include data storage that retains data while electrical power is applied, such as while a computing device is operating, but no longer retains the data when the computing device is not operating. For example, a volatile memory device may include dynamic random access memory (DRAM) associated with a computing device. A non-volatile memory device may include data storage that retains data without electrical power, such as when a computing device is not operating. For example, a non-volatile memory device may include a hard drive, solid state drive, optical storage medium, and so forth. In some cases, non-volatile memory may include a power source. In some cases, volatile memory may be associated with faster data transfer rates than non-volatile memory, enabling data to be stored in volatile memory more quickly and using less computational resources, and accessed more quickly and using less computational resources, when compared to storing data in, or accessing data from, non-volatile memory.

For example, an application may generate log data, which may be received by a host device or other type of computing device and stored in a volatile memory device. In some implementations, a file system may be executing in the volatile memory device, such as a "Filesystem in Userspace" (FUSE) framework. The file system may enable the volatile memory device to receive instructions from applications configured to interact with non-volatile memory. For example, a FUSE framework may receive an instruction from an application to write log data to a non-volatile memory device. In response to the instruction, the file system executing in volatile memory may instead store the log data in the volatile memory device. Use of a file system in volatile memory may enable data to be received from applications and other sources without requiring the applications or other sources to be configured to interact with the volatile memory device. For example, if one or more applications are currently configured to write log data to a disk, use of a file system to receive instructions from the application(s) may enable the log data to be stored in a volatile memory device without requiring the application(s) to be modified. As such, a file system may enable data from a large number of applications to be received and stored in volatile memory, including applications that are configured to write data to a non-volatile memory device, without requiring modification to the applications, and may enable multiple services to access the data in volatile memory.

The transfer of data stored in the volatile memory device between various processes requesting to access the data may then be controlled by a single process, such as a daemon. For example, a daemon may permit or deny access to data by other processes, control the order in which other processes are permitted to access the data, determine a sampling rate or otherwise control the quantity (e.g., size) or portions of the data to which particular processes are provided access, and so forth. In some cases, multiple services may be permitted to access the data in the volatile memory device simultaneously. In other cases, multiple services may access the data sequentially.

In some implementations, access to the data may be controlled based in part on priority data associated with the services. For example, each service may be associated with a priority value indicative of an importance of the service relative to other services. Continuing the example, a service that processes log data to detect errors and provide notifications in the event of certain errors may be associated with a greater priority value than a service that processes log data to determine and archive information regarding user interactions with a website. In some implementations, priority data associated with services may also indicate one or more rules or requirements associated with a service. For example, a particular service may require access to a particular type of data, or to receive at least a certain portion of the data within a certain timeframe, due to business or regulatory requirements.

In other implementations, access to the data may be controlled based in part on device data associated with the host device or other computing device that receives the data. For example, a first transfer rate at which data is received by a computing device may be compared to a second transfer rate at which data is transmitted from the device to determine a rate at which the quantity of data stored in the volatile memory device or other data storage associated with the computing device is increasing or decreasing. In cases where the rate at which data is being received by the computing device exceeds the rate at which data is being transmitted from the computing device, access to the data may be denied to particular services, one or more services may be provided with access only to a selected portion or quantity of the data, or data may be provided to particular services at a sampling rate that results in less than all of the data being provided to the services. As another example, a quantity of unused memory or values associated with other computational resources for the device may be used to determine particular services that are permitted to access the data, or a sampling rate or particular portion of data associated with the access. Continuing the example, if a quantity of unused memory is less than a threshold value, or if a quantity associated with processor utilization is greater than a threshold value, a sampling rate associated with the data provided to a particular service may be modified to enable less data to be provided to a service, which may enable the service to complete its use of the data more quickly, which in turn may enable the computing device to delete the data or transmit the data to another computing device more quickly.

In some implementations, a combination of priority data and device data may be used to permit or deny access to data, control the order in which services are permitted to access the data, or determine a sampling rate, quantity, or portion of the data to which particular services are provided access. For example, a threshold value for one or more computational resources associated with a host device, such as processor utilization or a quantity of unused memory, may be selected. The daemon or other type of process may then determine particular services to be granted or denied access to the data, sampling rates at which data is provided to the services, and so forth, that maintains the computational resources used by the host device within the selected threshold values. Priority data may be used to determine particular services to be granted access prior to other services, minimum or maximum sampling rates to be used with particular services, and so forth. In some cases, sampling rates for providing data to services may be changed dynamically, as memory and other computational resources associated with the host device change. Dynamic modification of access to data by various services is typically more difficult, and in some cases not possible, when the data is stored in a non-volatile memory device from which the data must be read and written by each service.

In some implementations, a service accessing the data may provide an indication of the portion, quantity, or sampling rate used by the service to generate an output. For example, if a service is provided access to an entire log file, but the service generates an output using only 10% of the data in the log file, the service may provide an indication of the quantity of data that was used. Based on this indication, a sampling rate for subsequent data to be provided to the service may be determined. For example, when additional log data is received, a sampling rate that results in 10% of the log data being provided to the service may be used, which may conserve time and computational resources associated with the host device. A service may also provide an indication of particular types of data, or other sampling parameters that were used to generate an output. For example, if a service uses only a particular type of data, or selected types of data, to generate an output, based on this indication, only portions of data that include the selected types may be provided to the service on subsequent occasions. Combinations of sampling parameters may be determined for each service. For example, based on an indication of data used by a particular service, the particular service may be provided with all data of a first type, 10% of data of a second type, 0% of data of a third type, and 5% of all other data in a log file.

In some implementations, after a set of services have generated respective outputs based on the data stored in volatile memory, a single copy of the data may be written to a non-volatile memory device. In some cases, only a portion of the data may be stored based on a quantity of unused data storage associated with the non-volatile memory device. For example, a sampling rate for storage of the data may be determined based on the quantity of unused data, and a portion of the data may be determined based on the sampling rate. In other implementations, other computational resources may be used to determine whether data is stored in a non-volatile memory device, and the quantity of data that is stored. For example, if the computational resources used to store data in a non-volatile memory device would reduce the resources available for other processes having a greater priority, storage of data in the non-volatile memory device may be omitted, or only a portion of the data may be stored.

As one skilled in the art will appreciate in light of this disclosure, certain embodiments may be capable of achieving certain advantages. For example, storage of log data, or other types of data, on a volatile memory device may enable the data to be accessed with a greater data transfer rate than most non-volatile memory devices. Additionally, data stored in volatile memory may be accessed multiple times, by multiple services, without requiring performance of financially or computationally expensive disk I/O operations to read data from, and write data to, a non-volatile memory device. Storage of data in volatile memory, without requiring the data to be read from a disk, may facilitate frequent changes in the sampling rate or particular portions of the data made available to various services. For example, based on computational resources associated with a computing device, a sampling rate for data provided to a service may be dynamically changed to maintain the use of computational resources within a desired range. Use of a file system to receive data from multiple applications may enable a large number of applications and services to provide data to, and receive data from volatile memory without requiring modification to the applications or services.

FIG. 1 depicts an implementation of a system 100 for receiving and storing log data 102 in volatile memory 104 for access by multiple services 106. While FIG. 1 describes receipt and processing of log data 102, in other implementations, other types of data may be used. For example, log data 102 is typically processed by multiple services 106, and as such, storage of the log data 102 in volatile memory 104 may facilitate access to the log data 102 without requiring read and write operations to a non-volatile memory device. However, other types of data that may be accessed by multiple services 106 may also be stored and processed using the implementations described herein.

At a first time T1, one or more servers 108, or other types of computing devices, may receive log data 102 from one or more applications 110. While FIG. 1 depicts a single server 108, any number and any type of computing device may be used. Additionally, while FIG. 1 depicts the server(s) 108 receiving the log data 102 from one or more applications 110 external to the server(s) 108, in other implementations, one or more applications 110 may be executing on the server(s) 108 in the volatile memory 104 or in non-volatile memory associated with the server(s) 108.

In some implementations, an application 110 may be configured to write data to a non-volatile memory device, such as a disk, rather than to store the log data 102 in the volatile memory 104 of the server(s) 108. For example, the application 110 may provide a write instruction 112 to the server(s) 108 to cause the server(s) 108 to store the log data 102 in non-volatile memory. However, the server(s) 108 may include a file system module 114 executing in the volatile memory 104. For example, the file system module 114 may execute a framework, such as the FUSE framework, that may serve as a gateway to enable access to the volatile memory 104 and other modules executing therein. The file system module 114 may be configured to receive commands from applications 110, such as a write instruction 112, and in response to the write instruction 112, may store the associated log data 102 in the volatile memory 104. The file system module 114 may enable one or more applications 110 intended to provide data to non-volatile memory devices to interact with the file system module 114 in the same manner that the application(s) 110 would interact with non-volatile memory. As such, if an existing application 110 is configured to interact with non-volatile memory devices, the application 110 may cause data to be stored in the volatile memory 104 by providing the same instructions to the file system module 114 that would be used to store data in non-volatile memory. Therefore, no changes to an existing application 110 may be necessary to enable the application 110 to interact with the system 100. Additionally, use of the file system module 114 may enable changes to the system 100 or use of volatile memory 104 to remain undetected by developers or other users associated with the application 110.

A data handling module 116 associated with the server(s) 108 may receive requests 118 from one or more services 106 to access the log data 102 and may control access to the log data 102 by the service(s) 106. In other implementations, as described with regard to FIG. 2, the data handling module 116 may provide data to one or more services 106 based on configuration data associated with the data handling module 116, without receiving requests 118 from the services 106. For example, one or more services 106 may be executing on the server(s) 108 rather than on separate computing devices, and in some cases, the services 106 may themselves be part of, or controlled by, the data handling module 116. The data handling module 116 may determine the services 106 to which the log data 102 is provided, the order or times at which the log data 102 is provided to the services 106, and in some cases, a particular portion or quantity of the log data 102 that is provided. For example, the data handling module 116 may determine a sampling rate to be used when providing data to a particular service 106.

In some implementations, the data handling module 116 may control access to the log data 102 based on device data 120. The device data 120 may include data indicative of the status of the server(s) 108 or of the volatile memory 104. For example, the device data 120 may indicate a rate at which log data 102 or other data is received by the sever(s) 108 over a selected period of time, a rate at which the server(s) 108 deletes data or transmits data to other computing devices, a quantity of unused volatile memory 104 or other memory associated with the server(s) 108, a quantity of other computational resources used by the server(s) 108, and so forth. Continuing the example, the rate at which data is being received by the server(s) 108 and the rate at which the server(s) 108 transmits data to other computing devices may be used to determine a sampling rate to be used when providing data to one or more services 106. In such a case, when the rate at which data is being received by the server(s) 108 exceeds the rate at which the server(s) 108 transmits data to other computing devices, a lower quantity of log data 102 may be provided to one or more services 106. The device data 120 or other data associated with the data handling module 116 may include one or more equations, rules, algorithms, and so forth that associate particular values for data transfer rates of the server(s) 108, unused memory of the server(s) 108, or other values for computational resources of the server(s) 108 with actions to be taken in response to requests 118 from particular services 106. Actions to be taken may include denying access to particular services 106, granting access to particular services 106, providing only a portion or particular quantity of log data 102 to particular services 106, or using a sampling rate to provide only a portion of the log data 102 to particular services 106.

In some implementations, the data handling module 116 may control access to the log data 102 based on priority data 122. The priority data 122 may associate priority values with particular services 106. Priority values may indicate the importance of particular services 106 relative to other services 106. For example, a service 106 that determines the occurrence of errors may be associated with a greater priority value than a service 106 that archives log data 102. Continuing the example, the priority data 122 may indicate a greater priority value for a first service 106(1) than for a second service 106(2). In such a case, based on the priority data 122, the data handling module 116 may provide log data 102 to the first service 106(1) prior to providing the log data 102 to the second service 106(2). In other cases, the data handling module 116 may provide the log data 102 to the first service 106(1) and deny access to the log data 102 to the second service 106(2). As another example, the data handling module 116 may provide different portions of the log data 102 or a lower quantity of log data 102 to the second service 106(2), or provide data using a different sampling rate than a sampling rate used when providing log data 102 to the first service 106(1).

For example, at the first time T1, FIG. 1 depicts the first service 106(1) providing a first request 118(1) to the data handling module 116 and the second service 106(2) providing a second request 118(2) to the data handling module 116. Based on the device data 120 and the priority data 122, at a second time T2, the log data 102 may be provided to the first service 106(1). At a third time T3 subsequent to the second time T2, the log data 102 may be provided to the second service 106(2).

Figure 2:
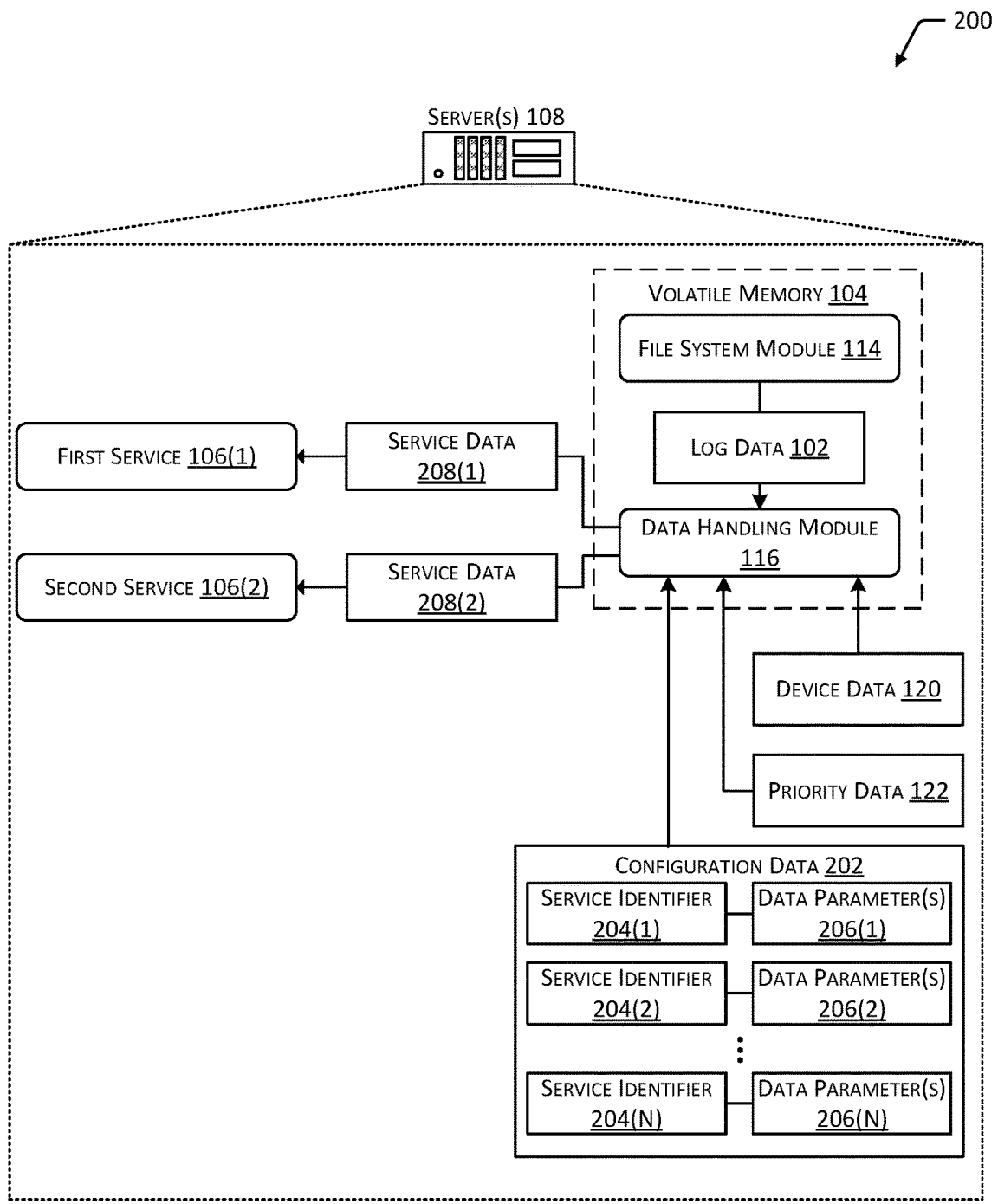
FIG. 2 depicts an implementation of a system for providing log data to multiple services based on configuration data indicating parameters for providing data to the services.

FIG. 2 depicts an implementation of a system 200 for providing log data 102 to multiple services 106 based on configuration data 202 indicating parameters for providing data to the services 106. As described with regard to FIG. 1, log data 102 may be received from an application 110 or other source. For example, log data 102 from an application 110 may be received using a file system module 114, which may store the log data 102 in volatile memory 104. In other implementations, log data 102 may be generated by one or more applications 110 or services 106 associated with the server(s) 108, or existing log data 102 may be accessed and stored in volatile memory 104.

As described with regard to FIG. 1, the data handling module 116 may determine the manner in which log data 102 is provided to one or more services 106 based at least in part on device data 120 and priority data 122. In some implementations, the data handling module 116 may determine the manner in which log data 102 is provided to one or more services 106 based at least in part on configuration data 202, which associates service identifiers 204 indicative of one or more services 106 with corresponding sets of data parameters 206 indicating the manner in which log data 102 is to be provided to the associated service 106. For example, a set of data parameters 206 may indicate a particular timeframe in which log data 102 is to be provided to a service 106, particular types or portions of the log data 102, particular quantities of the log data 102, a particular sampling rate to be used when providing the log data 102, an order in which access to the log data 102 is to be provided to particular services 106, circumstances under which access to log data 102 is to be denied to particular services 106, and so forth. Specifically, FIG. 2 depicts the configuration data 202 associating a first service identifier 204(1) with a first set of data parameters 206(1), a second service identifier 204(2) with a second set of data parameters 206(2), and any number of additional service identifiers 204(N) with corresponding sets of data parameters 206(N).

Based on the data parameters 206(1) associated with a first service 106(1), indicated in the configuration data 202, the data handling module 116 may determine first service data 208(1) to be provided to the first service 106(1). The first service data 208(1) may include a selected portion of the log data 102 that includes quantities or types of data indicated by the data parameters 206(1) for the first service 106(1). Similarly, based on the data parameters 206(2) associated with the second service 106(2), the data handling module 116 may determine second service data 208(2) to be provided to the second service 106(2), which may include a portion of the log data 102 determined using the data parameters 206(2) for the second service 106(2). In some cases, when log data 102 is received, the data handling module 116 may determine the service data 208 for various services 106 and provide the service data 208 independent of receiving requests 118 from the services 106. For example, the configuration data 202 may indicate particular services 106 that are to be provided with log data 102, and the manner in which the log data 102 is to be provided, on a periodic or continuous basis, or in response to receipt of log data 102. In some implementations, a combination of configuration data 202 and requests 118 may be used to provide log data 102 to services 106. For example, a first service 106(1) may be automatically provided with at least a portion of the log data 102 based on the configuration data 202, while a second service 106(2) may be provided with at least a portion of the log data 102 in response to a request 118 received from the second service 106(2).

Figure 3:
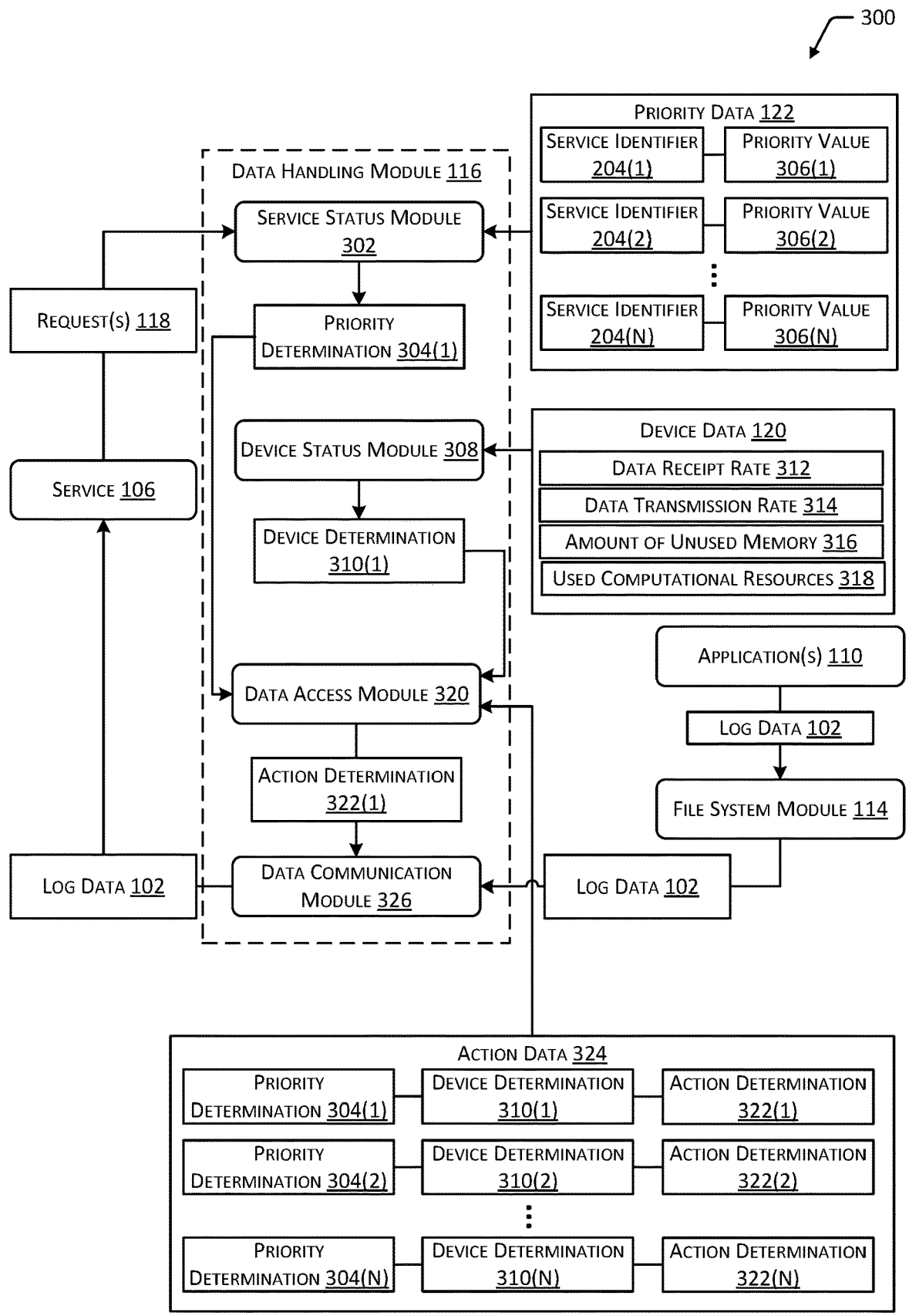
FIG. 3 is a block diagram depicting an implementation of a data handling module for determining the manner in which access to log data is provided to one or more services.

FIG. 3 is a block diagram 300 depicting an implementation of a data handling module 116 for determining the manner in which access to log data 102 is provided to one or more services 106. As described with regard to FIG. 1, a data handling module 116 associated with one or more servers 108 or other computing devices may receive requests 118 from one or more services 106. Each request 118 may include an identifier or other data indicative of the service 106 providing the request 118 and an identifier or other indication of the data to which access is requested, such as log data 102 received from an application 110. As described with regard to FIG. 2, in some implementations, configuration data 202 indicative of the services 106 that receive log data 102 may be accessed by the data handling module 116 in lieu of or in addition to receiving requests 118 from one or more services 106. A service status module 302 may receive the request(s) 118 from the service(s) 106 or access the configuration data 202. Based on the particular services 106 indicated in the configuration data 202 or that provide requests 118, and priory data 122 that indicates the importance of one or more of the services 106 relative to other services 106, the service status module 302 may generate a priority determination 304(1). The priority determination 304(1) may indicate at least a portion of the services 106 indicated in the configuration data 202 or from which requests 118 were received and an indication of a priority of the service(s) 106, such as a hierarchal list or other structure associating the services 106.

For example, FIG. 3 depicts the priority data 122 associating service identifiers 204 for particular services 106 with corresponding priority values 306. A priority value 306 may include a qualitative or quantitative indication of the importance of a service 106, such as a numerical value. In some cases, the priority values 306 for particular services 106 may change over time. For example, during specific times of day, such as times associated with peak traffic, a first service 106 may be associated with a greater priority value 306 than a second service 106, while at other times, the second service 106 may be associated with a greater priority value 306. As another example, the time that has passed since a service 106 has previously accessed log data 102 may be used to determine the priority value 306 associated with the service 106. For example, a service 106 that has not accessed the log data 102 for an hour may be associated with a greater priority value 306 than a service that previously accessed the log data 102 during the past minute. While the priority data 122 is shown associating a first service identifier 204(1) with a first priority value 306(1) and a second service identifier 204(2) with a second priority value 306(2), any number of service identifiers 204(N) may be associated with any number of priority values 306(N). Additionally, while FIG. 3 depicts the priority data 122 associating example service identifiers 204 with one priority value 306, in other implementations, a priority value 306 may be associated with multiple service identifiers 204, or a service identifier 204 may be associated with multiple priority values 306.

A device status module 308 may determine device data 120 associated with the server(s) 108 or other computing devices, or associated with the volatile memory 104 or other components of the server(s) 108. Based on the device data 120, the device status module 308 may generate a device determination 310(1) indicative of the health, status, utilized computational resources, or other data associated with operation of the server(s) 108. For example, the device data 120 may indicate data transfer rates associated with the server(s) 108 or volatile memory 104, such as a data receipt rate 312 indicative of a rate at which log data 102 or other data is received by the server(s) 108 and a data transmission rate 314 indicative of a rate at which log data 102 or other data is transmitted from the server(s) 108 to other computing devices. For example, a relationship between the data receipt rate 312 to the data transmission rate 314 may be used to determine a rate at which the volatile memory 104 is decreasing or increasing. Continuing the example, in cases where the data receipt rate 312 exceeds the data transmission rate 314, access to the log data 102 may be denied to one or more services 106, or only a portion of the log data 102 may be provided to particular services 106. Device data 120 may also indicate an amount of unused memory 316 associated with the volatile memory 104 or other memory devices, such as a non-volatile memory device associated with the server(s) 108. For example, as the quantity of available volatile memory 104 decreases, smaller portions of the log data 102 may be provided to particular services 106. As another example, as a quantity of available non-volatile memory decreases, storage of log data 102 on a non-volatile memory device, after use of the log data 102 by one or more services 106 has been completed, may be omitted, or only a portion of the log data 102 may be stored. In such a case, access to a service 106 that stores log data 102 to a non-volatile memory device, such as an archival service that compresses and stores log data 102, may be denied, delayed, or only a portion of the log data 102 may be provided to the service 106. Device data 120 may additionally indicate the used computational resources 318 of the server(s) 108 or other computing devices. For example, based on a relationship between processor utilization of the server(s) 108 and one or more threshold values, the quantity of log data 102 provided to one or more services 106 may be modified. Continuing the example, the amount of log data 102 provided to services 106 may be dynamically increased or decreased to maintain various used computational resources 318 of the server(s) 108 within one or more threshold ranges.

A data access module 320 may generate an action determination 322(1) based on the priority determination 304(1) and the device determination 310(1). The action determination 322(1) may indicate the particular services 106 to which log data 102 is to be provided, the services 106 to which access to the log data 102 is to be denied, the times at which the log data 102 is to be provided to particular services 106 (e.g., an order in which certain services 106 receive the log data 102), and so forth. The action determination 322(1) may also indicate particular portions or quantities of log data 102 to be provided to particular services 106, sampling rates at which log data 102 is to be provided to particular services 106, and so forth. The action determination 322(1) may be determined based in part on action data 324. Action data 324 may associate particular action determinations 322 with corresponding priority determinations 304 and device determinations 310. While FIG. 3 depicts a single action determination 322 associated with a single corresponding priority determination 304 and device determination 310, in other implementations, action determinations 322, priority determinations 304, and device determinations 310 may be associated in relationships other than one-to-one relationships. For example, a single action determination 322 may be associated with multiple possible combinations of priority determinations 304 and device determinations 310. FIG. 3 depicts example action data 324 in which a first action determination 322(1) is associated with a first priority determination 304(1) and a first device determination 310(1), a second action determination 322(2) is associated with a second priority determination 304(2) and a second device determination 310(2), and any number of additional action determinations 322(N) may be associated with any number of priority determinations 304(N) and device determinations 310(N). Based on the action determination 322(1), the data communication module 326 may communicate at least a portion of the log data 102 to the service 106. For example, based on a determined sampling rate, portion, or quantity of log data 102 indicated in the action determination 322(1), the data communication module 326 may determine a portion of the log data 102 and generate and transmit the portion of the log data 102 to the service 106. Continuing the example, as described with regard to FIG. 1, log data 102 may be received from one or more applications 110 by a file system module 114, which may store the log data 102 in volatile memory. The data communication module 326 may then access the log data 102 in the volatile memory 104 and determine portions of the log data 102 to be provided to various services 106 based on the associated action determinations 322.

Figure 4:
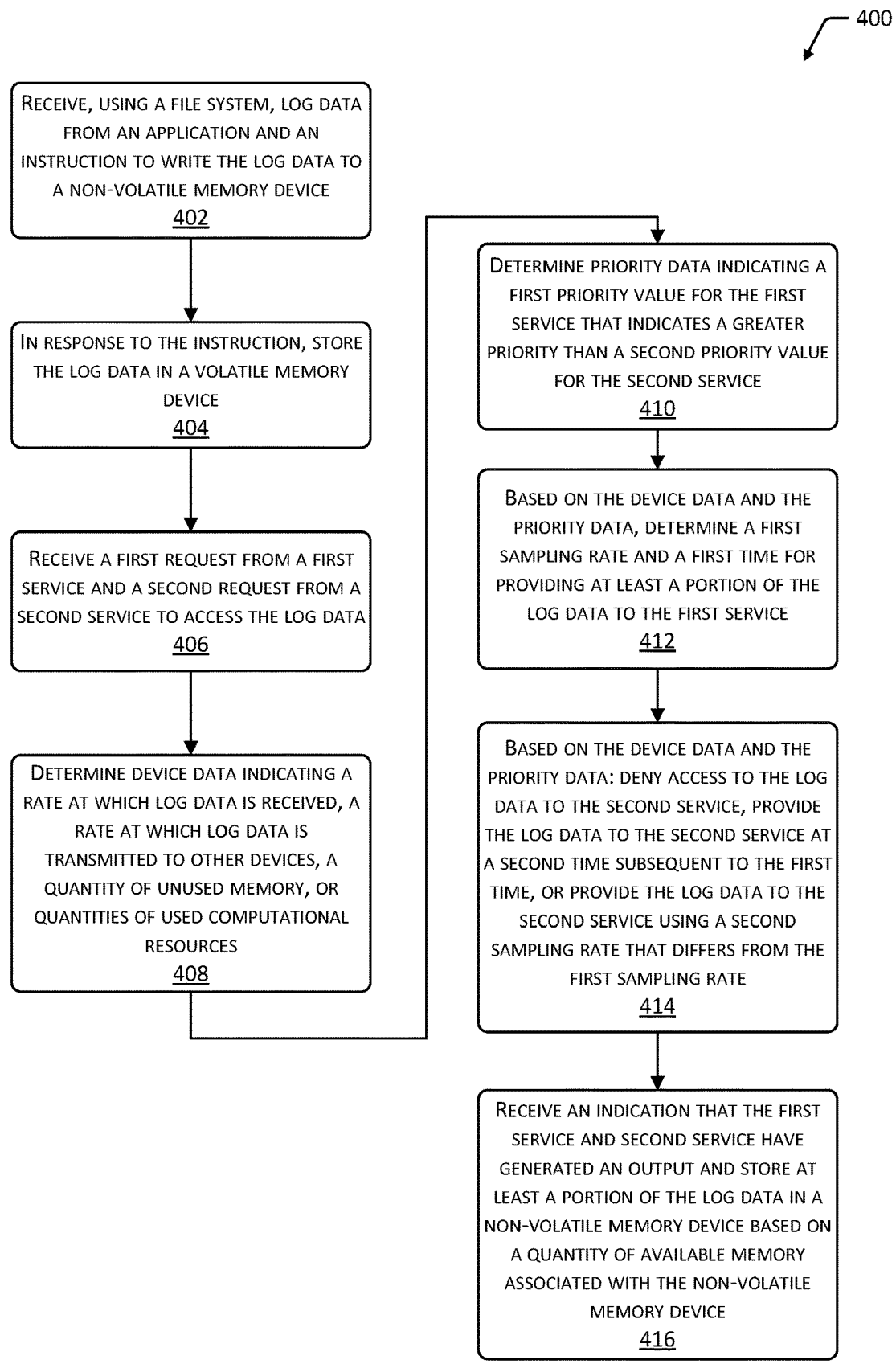
FIG. 4 is a flow diagram illustrating an implementation of a method for providing log data to services based on device data and priority data.

FIG. 4 is a flow diagram 400 illustrating an implementation of a method for providing log data 102 to services 106 based on device data 120 and priority data 122. At 402, a file system may be used to receive log data 102 from an application, and a write instruction to write the log data 102 to a non-volatile memory device. For example, as described with regard to FIG. 1, a file system module 114, such as a FUSE framework or other type of file system, may be configured to receive a write instruction 112 from an application 110, and in response to the write instruction 112, store the associated log data 102 in volatile memory 104. Use of a file system to receive data from applications 110 may enable data from the applications 110 to be stored in volatile memory 104 without requiring the applications 110 to be modified to interact with a volatile memory device 104. For example, an existing application 110 configured to write data to a disk may provide the same write instruction 112 to the file system module 114, resulting in the associated data being stored in volatile memory 104 without modifying the application 110.

As such, at 404, in response to the instruction, the log data 102 may be stored in a volatile memory device. As described previously, a volatile memory device may include data storage that retains data while a computing device is running, but no longer retains the data when the computing device ceases running. For example, a volatile memory device may include DRAM associated with a computing device. In some implementations the volatile memory device may be associated with a faster data transfer rate than the data transfer rate associated with a non-volatile memory device, enabling data in the volatile memory device to be accessed more quickly.

At 406, a first request 118(1) may be received from a first service 106(1) and a second request 118(2) may be received from a second service 106(2) to access the log data 102. Any number of services 106 may provide requests 118 to access the log data 102 ranging from a single service 106 to a large number of services 106. In some implementations, if no service 106 requests to access the log data 102 for a threshold length of time are received, the log data 102 may be stored in a non-volatile memory device. In other cases, if no service 106 requests to access the log data 102 for a threshold length of time are received, the log data 102 may be deleted. In other implementations, as described with regard to FIGS. 2 and 5, a service 106 may be provided with at least a portion of received log data 102 in the absence of a request 118, based on configuration data 202 associated with the server(s) 108 or other computing device(s) that receive the log data 102.

At 408, device data 120 associated with the server(s) 108 or other computing device(s) receiving the requests 118 may be determined. The device data 120 may indicate a rate at which log data 102 is received, a rate at which log data 102 is transmitted to other devices, a quantity of unused memory 104, or quantities of used computational resources. As described with regard to FIG. 2, device data 120 may indicate a data receipt rate 312 indicative of a rate at which log data 102 or other data is received by the server(s) 108 or other computing devices and a data transmission rate 314 indicative of a rate at which log data 102 or other data is transmitted to other computing devices. A relationship between the data receipt rate 312 and the data transmission rate 314 may be used to determine a rate at which the available volatile memory 104 is decreasing or increasing. Device data 120 may also indicate an amount of unused memory 316 associated with the volatile memory 104 or other memory devices or the used computational resources 318 of the server(s) 108 or other computing devices. For example, based on a relationship between the amount of unused memory 316 or used computational resources 318 and one or more threshold values, the quantity of log data 102 provided to one or more services 106 may be modified.

At 410, priority data 122 indicating a first priority value 306(1) for the first service 106(1) and a second priority value 306(2) for the second service 106(2) may be determined. The first priority value 306(1) may indicate a greater priority than the second priority value 306(2). As described with regard to FIG. 2, priority data 122 may associate service identifiers 204 for particular services 106 with corresponding priority values 306 indicating the importance of particular services 106 relative to other services 106. For example, based on the priority associated with a particular service 106, access to the particular service 106 may be denied, provided less frequently, provided subsequent to provision of access to other services 106, and so forth. As another example, based on the priority associated with a particular service 106, particular portions or quantities of log data 102 may be provided to the particular service 106, such as by using a sampling rate that results in less than all of the log data 102 being provided to the service 106.

As such, at 412, based on the device data 120 and the priority data 122, a first sampling rate and a first time for providing at least a portion of the log data 102 to the first service 106(1) may be determined. The time at which the log data 102 is provided may be selected based on traffic received by the server(s) 108 or other computing devices at particular times, the computational resources used by the server(s) 108, and so forth. The sampling rate may be selected based on the data receipt rate 312, data transmission rate 314, or amount of unused memory 316 associated with the server(s) 108. In some cases, all of the log data 102 may be provided to the first service 106(1). In other cases, only a portion of the log data 102 may be provided to the first service 106(1) based on the determined sampling rate.

At 414, based on the device data 120 and the priority data 122, access to the log data 102 may be denied to the second service 106(2), the log data 102 may be provided to the second service 106(2) at a second time subsequent to the first time, the log data 102 may be provided to the second service 106(2) using a second sampling rate that differs from the first sampling rate, or a combination of these actions may be used. For example, due to a lower priority value 306 being associated with the second service 106(2) relative to the first service 106(1), the second service 106(2) may be provided with a smaller quantity or different portions of log data 102, may be provided with the log data 102 only after the first service 106(1) has received the log data 102, or may be denied access to the log data 102 at times when providing access to the second service 106(2) may reduce access to the first service 106(1) or reduce performance of other computational processes.

At 416, an indication that the first service 106(1) and second service 106(2) have generated respective outputs based on the log data 102 may be received. In response to these indications, at least a portion of the log data 102 may be stored in a non-volatile memory device. For example, after one or more selected services 106 have accessed the log data 102, the server(s) 108 or other computing devices may be configured to store the log data 102 in a non-volatile memory device, such as by writing the log data 102 to a disk. In some implementations, writing of the log data 102 to a non-volatile memory device may be performed by the data handling module 116. In other implementations, writing of the log data 102 to a non-volatile memory device may be performed by a service 106. For example, the data handling module 116 may be configured to provide log data 102 to a service 106 that compresses and archives log data 102 subsequent to providing the log data 102 to other services 106. In some implementations, a sampling rate associated with storage of the log data 102 to a non-volatile memory device may be determined based on a quantity of available memory associated with the non-volatile memory device. For example, as the amount of available memory associated with the non-volatile memory device decreases, the sampling rate for storage of the log data 102 may decrease, resulting in a smaller quantity of data being stored in the non-volatile memory device. Other computational resources may also be used to determine whether log data 102 is stored in a non-volatile memory device, and the particular types and quantities of log data 102 that are stored. For example, during times when the computational resources used to store log data 102 in a non-volatile memory device would hinder performance of applications 110, services 106, or other functions of the server(s) 108, storage of log data 102 may be omitted, or only particular types of log data 102, such as data indicative of errors of a particular type, may be stored.

Figure 5:
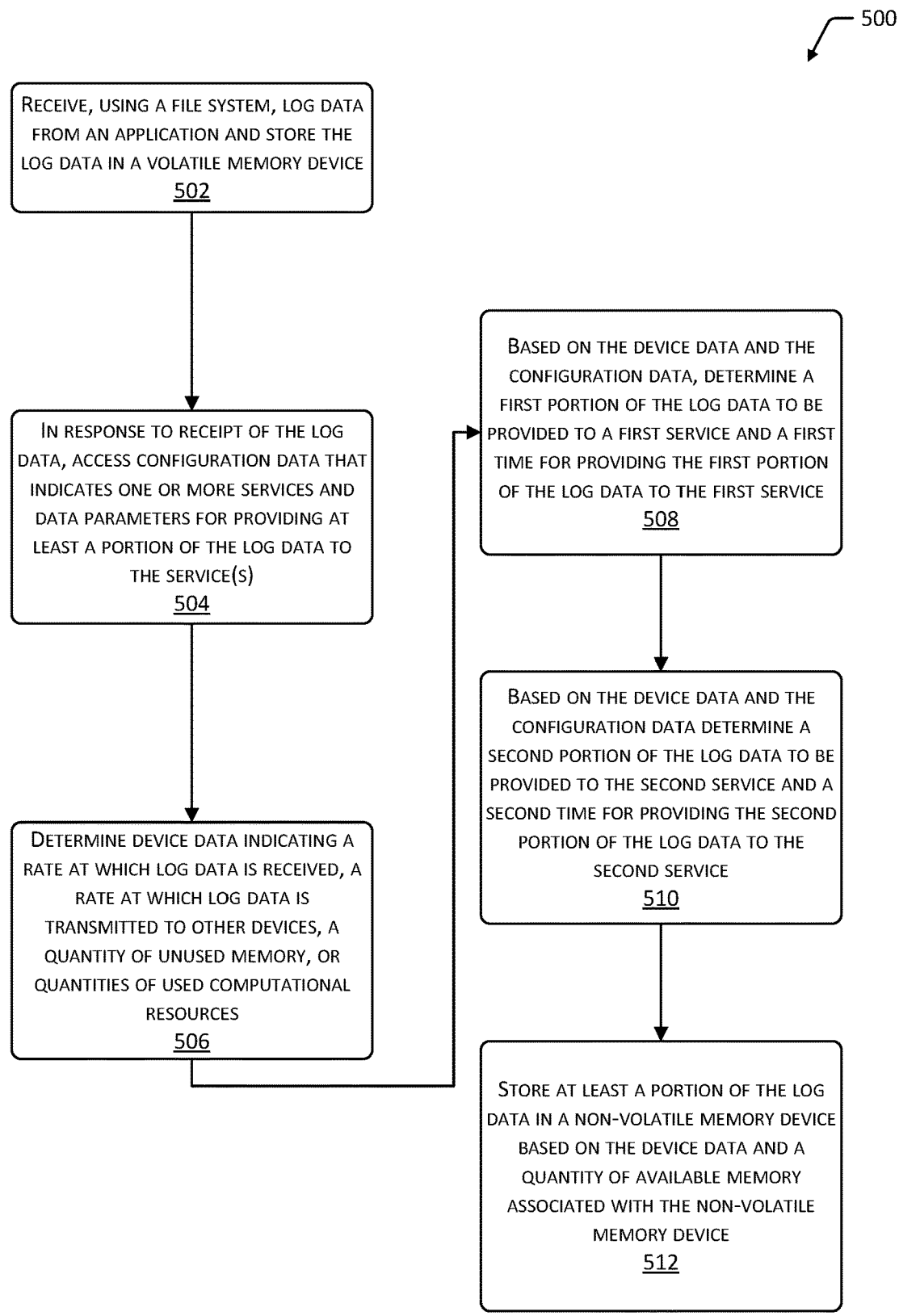
FIG. 5 is a flow diagram illustrating an implementation of a method for providing log data to multiple services based on configuration data indicating parameters for providing data to the services.

FIG. 5 is a flow diagram 500 illustrating an implementation of a method for providing log data 102 to multiple services 106 based on configuration data 202 indicating parameters for providing data to the services 106. At 502, using a file system, log data 102 may be received from an application 110 and stored in a volatile memory device. As described with regard to FIGS. 1, 2, and 4, an application 110 may be configured to cause log data 102 to be written to a non-volatile memory device. However, receipt of the log data 102 and a write instruction 112 by the file system may cause the log data 102 to be stored in volatile memory 104.

At 504, in response to receipt of the log data 102, configuration data 202 may be accessed. The configuration data 202 may indicate one or more services 106 and data parameters 206 for providing at least a portion of the log data 102 to the service(s) 106. For example, as described with regard to FIG. 2, a set of data parameters 206 for a service 106 may indicate a time at which log data 102 is to be provided to the service 106, types or quantities of the log data 102 to be provided, a sampling rate to be used when providing the log data 102, an order in which access to the log data 102 is to be provided to different services 106, circumstances under which access to log data 102 is to be denied to particular services 106, and so forth. In some cases, one or more of the data parameters 206 may depend upon device data 120. For example, the sampling rate indicated in the data parameters 206 for a service 106 may depend on the amount of unused memory 316 or used computational resources 318 associated with the computing device that receives the log data 102.

At 506, device data 120 may be determined that indicates a rate at which data is received, a rate at which data is transmitted to other devices, a quantity of unused memory, or quantities of used computational resources. For example, based on a relationship between one or more values indicated in the device data 120 and one or more threshold values, or a relationship between the device data 120 and the data parameters 206 of the configuration data 202, the portion of the log data 102 provided to one or more services 106 may be modified.

At 508, based on the device data 120 and the configuration data 202, a first portion of the log data 102 to be provided to a first service 106(1) and a first time for providing the first portion of the log data 102 to the first service 106(1) may be determined. For example, as described with regard to FIG. 2, based on the data parameters 206 for each service 106 indicated in the configuration data 202, service data 208 for each service 106 may be generated. The service data 208 may include a particular portion of the log data 102 to be provided to the service 106. The data parameters 206 may also indicate a particular time for providing the portion of the log data 102 to a particular service 106, such as prior to or subsequent to access by another service 106, within a particular time subsequent to receiving the log data 102, within a particular time subsequent to the previous access to the log data 102 by the service 106, and so forth. In some implementations, the first portion of the log data 102 may include all of the log data 102. In other implementations, the first portion may include log data 102 having certain characteristics. In still other implementations, the first portion may include a quantity of the log data 102 that is determined using a sampling rate. In other implementations, the first portion of the log data 102 may include none of the log data 102, and the first service 106(1) may be denied access to the log data 102.

In a similar manner, at 510, based on the device data 120 and the configuration data 202, a second portion of the log data 102 to be provided to a second service 106(2) and a second time for providing the second portion of the log data 102 to the second service 106(2) may be determined. The second portion of the log data 102 may include the same or different portions of the log data 102 as those provided to the first service 106(1).

At 512, at least a portion of the log data 102 may be stored in a non-volatile memory device based on the device data 120 and a quantity of available memory associated with the non-volatile memory device. For example, at times when the device data 120 indicates that the computational resources used to store log data 102 in a non-volatile memory device would hinder performance of applications 110, services 106, or other functions of the server(s) 108, storage of log data 102 may be omitted, or only a portion of the log data 102 may be stored. Similarly, at times when available memory associated with a non-volatile memory device is low, storage of log data 102 may be omitted, or only a portion of the log data 102 may be stored.

Figure 6:
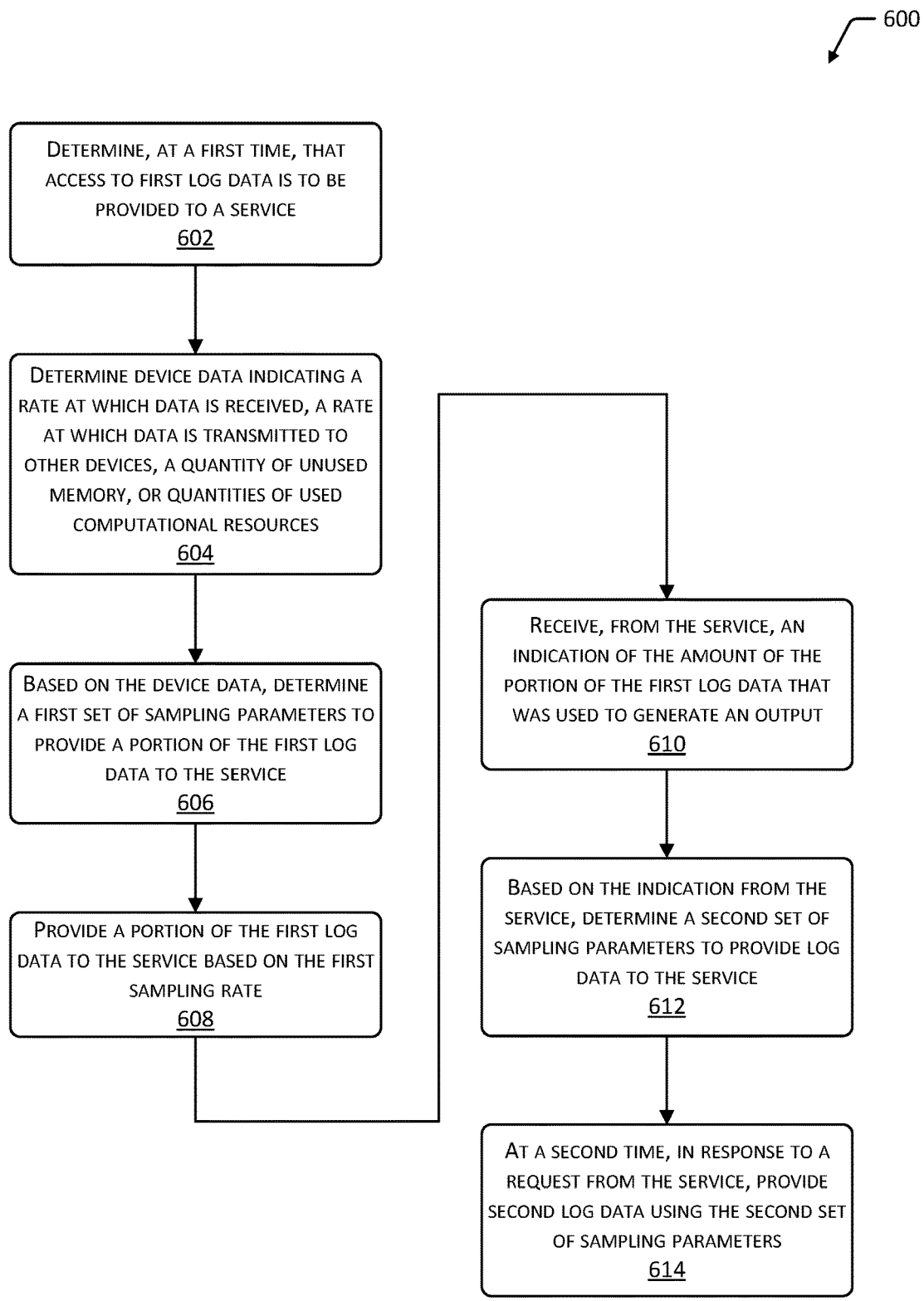
FIG. 6 is a flow diagram illustrating an implementation of a method for determining a sampling rate for providing log data to a service based on the data used by the service to generate an output.

FIG. 6 is a flow diagram 600 illustrating an implementation of a method for determining a sampling rate for providing log data 102 to a service 106 based on the data used by the service 106 to generate an output. At 602, at a first time, a determination may be made that access to first log data 102 is to be provide to a service 106. In some implementations, the service 106 may provide a request 118 to access the first log data 102. In other implementations, configuration data 202 may be used to determine that the service 106 is to be provided access and the data parameters 206 associated with access to the log data 102 by the service 106. In some implementations, the request 118 or configuration data 202 may include a service identifier 204 indicative of the service 106 and an indication of the data to which access is requested or permitted, and priority data 122 may be used to determine a priority value 306 associated with the service 106.

At 604, device data 120 may be determined. The device data 120 may indicate a rate at which data is received, a rate at which data is transmitted to other devices, a quantity of unused memory, or quantities of used computational resources. As described with regard to FIGS. 3-5, device data 120 may indicate one or more of a data receipt rate 312, a data transmission rate 314, an amount of unused memory 316, or one or more values associated with used computational resources 318. For example, based on a relationship between one or more values indicated in the device data 120 and one or more threshold values, the quantity of log data 102 provided to one or more services 106 may be modified.

At 606, based on the device data 120, a first set of sampling parameters that may be used to provide a portion of the first log data 102 to the service 106 may be determined. The sampling parameters may include a sampling rate or an indication of particular types of log data 102 to be provided. For example, a service 106 may only use selected types of data to generate an output and as such, may only be provided with all or a portion of those selected types of log data 102.

As described with regard to FIG. 3, in some implementations, action data 324 that associates a device determination 310 based on the device data 120 and a priority determination 304 based on priority data 122 may be used to generate an action determination 322 indicating a particular action to be performed with regard to the service 106 associated with the priority determination 304. For example, an action determination 322 may indicate a sampling rate or other sampling parameters to use when transmitting log data 102 to the service 106. In other implementations, one or more rules or algorithms may be used to determine the sampling parameters. For example, a sampling rate may be calculated based on a relationship between the data receipt rate 312 and data transmission rate 314 indicated in the device data 120. In some cases, one or more rules may indicate a maximum or minimum sampling rate to be used or particular types of log data 102 to be provided to particular services 106. For example, a particular service 106 may be associated with a minimum usable sampling rate for a certain type of log data 102. As another example a rule may exist that indicates that services 106 associated with a priority value 306 greater than a threshold priority value are to be associated with a minimum sampling rate.

At 608, a portion of the first log data 102 may be provided to the service 106 based on the determined first sampling rate. For example, a sampling rate may cause a particular proportion of the log data 102 to be provided from the server(s) 108 to the service 106, such as one sample for every ten samples received by the server(s) 108. In other implementations, in place of a sampling rate, a particular portion or quantity of the log data 102 may be determined and provided to the service 106, such as log data 102 having a specified type or characteristic.

At 610, an indication from the service 106 may be received that indicates an amount of the portion of the first log data 102 that was used by the service 106 to generate an output. For example, a service 106 may, itself, use a sampling rate when generating an output, or may only use a selected portion or quantity of the particular log data 102 that the service 106 receives. In such a case, portions of the log data 102 provided to the service 106 may remain unused.

At 612, a second set of sampling parameters for providing log data 102 to the service 106 may be determined based on the indication from the service 106. For example, if a service 106 only utilizes a certain portion of the log data 102 that was received or only uses log data 102 having specified characteristics, at a subsequent time, the quantity or type of log data 102 provided to the service 106 may be modified.

At 614, at a second time subsequent to the first time, in response to a request 118 from the service 106, second log data 102 may be provided to the service 106 using the second set of sampling parameters. For example, if a service 106 sends an indication that only a portion of the first log data 102 that was previously sent to the service 106 was used, the second sampling rate may be selected to provide a quantity of the second log data 102 to the service 106 that is within a threshold range of the quantity of the first log data 102 that the service 106 previously used. In some implementations, if the service 106 previously used all of the data that was provided, the second sample rate may be selected to cause a greater quantity of data to be provided to the service 106 at the second time. If the service 106 previously used only a subset of the first log data 102 that was provided, the second sample rate may be selected to cause log data 102 having the characteristics of the used subset to be provided to the service 106 at the second time.

Figure 7:
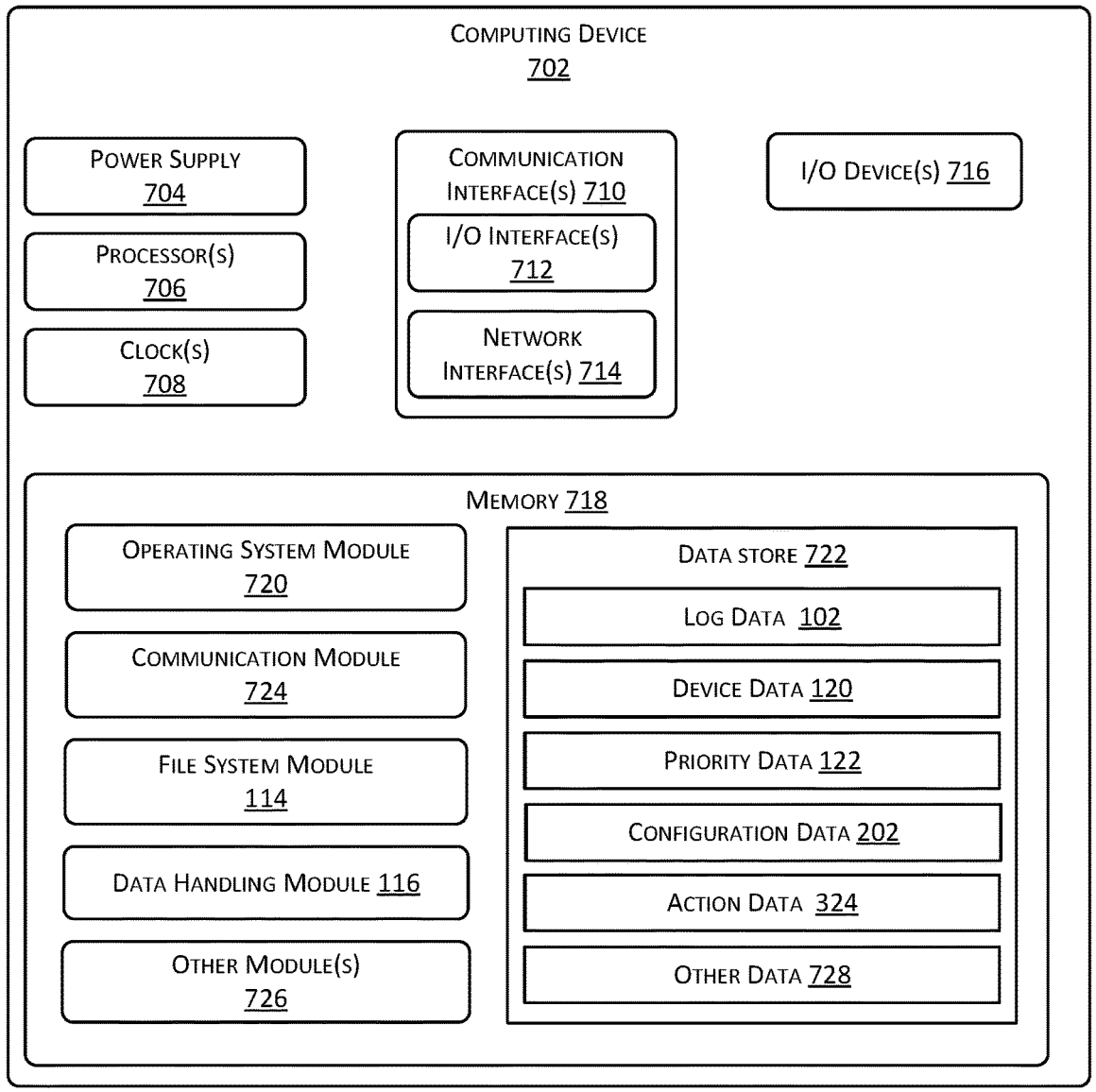
FIG. 7 is a block diagram illustrating an implementation of a computing device that may be used within the present disclosure.

FIG. 7 is a block diagram 700 illustrating an implementation of a computing device 702 that may be used within the present disclosure. The computing device 702 may include one or more servers 108, as shown in FIG. 1. In other implementations, other types of computing devices 702 may be used in addition to or in place of the servers 108. Additionally, while FIG. 7 depicts a single block diagram 700 of a computing device 702, any number and any type of computing devices 702 may be used to perform the functions described herein.

One or more power supplies 704 may be configured to provide electrical power suitable for operating the components of the computing device 702. In some implementations, the power supply 704 may include a rechargeable battery, fuel cell, photovoltaic cell, power conditioning circuitry, and so forth.

The computing device 702 may include one or more hardware processor(s) 706 (processors) configured to execute one or more stored instructions. The processor(s) 706 may include one or more cores. One or more clock(s) 708 may provide information indicative of date, time, ticks, and so forth. For example, the processor(s) 706 may use data from the clock 708 to generate a timestamp, trigger a preprogrammed action, and so forth.

The computing device 702 may include one or more communication interfaces 710, such as input/output (I/O) interfaces 712, network interfaces 714, and so forth. The communication interfaces 710 may enable the computing device 702, or components of the computing device 702, to communicate with other computing devices 702 or components of the other computing devices 702. The I/O interfaces 712 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 712 may couple to one or more I/O devices 716. The I/O devices 716 may include any manner of input devices or output devices associated with the computing device 702. For example, I/O devices 716 may include touch sensors, displays, touch sensors integrated with displays (e.g., touchscreen displays), keyboards, mouse devices, microphones, image sensors, cameras, scanners, speakers or other types of audio output devices, haptic devices, printers, and so forth. In some implementations, the I/O devices 716 may be physically incorporated with the computing device 702. In other implementations, I/O devices 716 may be externally placed.

The network interfaces 714 may be configured to provide communications between the computing device 702 and other devices, such as the I/O devices 716, routers, access points, and so forth. The network interfaces 714 may include devices configured to couple to one or more networks including local area networks (LANs), wireless LANs (WLANs), wide area networks (WANs), wireless WANs, and so forth. For example, the network interfaces 714 may include devices compatible with Ethernet, Wi-Fi, Bluetooth, ZigBee, Z-Wave, 3G, 4G, 5G, LTE, and so forth.

The computing device 702 may include one or more busses or other internal communications hardware or software that allows for the transfer of data between the various modules and components of the computing device 702.

As shown in FIG. 7, the computing device 702 may include one or more memories 718. The memory 718 may include a volatile memory device, such as DRAM. The memory 718 may also include a non-volatile memory device, such as a hard disk or solid state drive. For example, the memory 718 may include one or more computer-readable storage media (CRSM). The CRSM may be any one or more of an electronic storage medium, a magnetic storage medium, an optical storage medium, a quantum storage medium, a mechanical computer storage medium, and so forth. The memory 718 may provide storage of computer-readable instructions, data structures, program modules, and other data for the operation of the computing device 702. A few example modules are shown stored in the memory 718, although the same functionality may alternatively be implemented in hardware, firmware, or as a system on a chip (SoC).

The memory 718 may include one or more operating system (OS) modules 720. The OS module 720 may be configured to manage hardware resource devices such as the I/O interfaces 712, the network interfaces 714, the I/O devices 716, and to provide various services to applications or modules executing on the processors 706. The OS module 720 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

One or more data stores 722 and one or more of the following modules may also be associated with the memory 718. As described previously, data, such as log data 102 may be stored in volatile memory 104 and accessed by one or more services 106. In some implementations, at least a portion of the log data 102 may be stored in a non-volatile memory device after the service(s) 106 have generated one or more outputs based on the log data 102. The modules in the data store(s) 722 may be executed as foreground applications, background tasks, daemons, and so forth. The data store(s) 722 may use a flat file, database, linked list, tree, executable code, script, or other data structure to store information. In some implementations, the data store(s) 722 or a portion of the data store(s) 722 may be distributed across one or more other devices including other computing devices 702, network attached storage devices, and so forth.

A communication module 724 may be configured to establish communications with one or more other computing devices 702. Communications may be authenticated, encrypted, and so forth.

The memory 718 may also store the file system module 114. The file system module 114 may be configured to receive log data 102, or other types of data, from other computing devices 702, or from applications 110 executing on the computing device 702. The file system module 114 may be configured to store received data in volatile memory 104 in response to write instructions 112 from an application 110 or other source of data intended to cause storage of the data on a non-volatile memory device. For example, the file system module 114 may include a FUSE framework. In response to receipt of log data 102 and a write instruction 112 to store the log data 102 on a disk, the file system module 114 may cause the log data 102 to be stored in volatile memory 104.

The memory 718 may also include the data handling module 116. The data handling module 116 may control access to data stored in volatile memory 104. For example, the data handling module 116 may receive requests 118 to access data from one or more services 106, which may be executing on separate computing devices 702 or on the same computing device 702 as the data handling module 116. In other cases, the data handling module 116 may access configuration data 202 that indicates services 106 to be provided with access to data without receiving requests 108. The data handling module 116 may access priority data 122 to determine a priority associated with the services 106 indicated in configuration data 202 or that provide a request 118. For example, priority data 122 may associate service identifiers 204 for services 106 with corresponding priority values 306 indicative of the importance of an associated service 106 relative to other services 106. The data handling module 116 may also access device data 120 indicative of rates at which the computing device 702 receives and transmits data, which may be used to determine a rate at which a quantity of available memory associated with the computing device 702 is increasing or decreasing. The device data 120 may also indicate an amount of unused memory 316 or quantities of used computational resources 318 associated with the computing device 702. A relationship between the amount of unused memory 316 or quantities of used computational resources 318 and one or more threshold values may be used to determine the manner in which data is provided to one or more services 106. For example, as described with regard to FIG. 3, the data handling module 116 may generate a priority determination 304 for one or more services 106 based on the priority data 122 and a device determination 310 based on the device data 120 determined from the computing device 702. Based on the priority determination 304, device determination 310, and action data 324 that associates action determinations 322 with priority determinations 304 and device determinations 310, the data handling module 116 may determine a manner in which to provide data to one or more services 106. For example, an action determination 322 may indicate a time or order in which to provide data to multiple services 106, a sampling rate to use when providing data to one or more services 106, particular types, portions, or quantities of data to provide to particular services 106, and in some cases, particular services 106 to be denied access to the data. Continuing the example, the data handling module 116 may provide data to services 106 in a manner that maintains the computational resources used by the computing device 702 within selected threshold ranges, preserves available memory of the computing device 702, avoids consuming resources used by the application 110 providing the data, and so forth, while prioritizing the provision of data to services 106 associated with greater priority values 306 than other services 106.

Other modules 726 may also be present in the memory 718. For example, other modules 726 may include modules for receiving input to modify the priority data 122. As described previously, other modules 726 in the computing device 702 may include applications 110 that generate log data 102 or other types of data, and services 106 that request access to the data. Other modules 726 may also include encryption modules to encrypt and decrypt communications between computing devices 702, authentication modules to authenticate communications sent or received by computing devices 702, a permission module to assign, determine, and manage user permissions to access or modify data associated with computing devices 702, and so forth.

Other data 728 within the data store(s) 722 may include configurations, settings, preferences, and default values associated with computing devices 702. Other data 728 may also include encryption keys and schema, access credentials, and so forth. Other data 728 may also include network data indicative of networks accessible to one or more computing devices 702.

In different implementations, different computing devices 702 may have different capabilities or capacities. For example, particular servers 108 may have greater processing capabilities or data storage capacity than other servers 108.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Further-more, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising a host device including:
one or more memories storing computer-executable instructions, wherein the one or more memories include:
a first memory device comprising a volatile memory device having a first data transfer rate;
a second memory device comprising a non-volatile memory device having a second data transfer rate that differs from the first data transfer rate; and
one or more hardware processors to execute the computer-executable instructions to:
receive, using a file system executing in the first memory device, first log data from a computing device executing an application, wherein the file system stores the first log data in the first memory device in response to an instruction from the application to write the first log data to the second memory device;
determine device data indicative of:
a first transfer rate at which the first log data is received by the host device,
a second transfer rate at which the first log data is transmitted from the host device, and
a quantity of unused memory associated with the first memory device;
determine priority data indicative of: a first priority value for a first service executing on a computing device and a second priority value for a second service executing on a computing device, wherein the first priority value indicates a greater priority than the second priority value;
based on the priority data, at a first time, provide at least a first portion of the first log data and at least a first portion of the device data to the first service for generation of a first output based on the at least a first portion of the first log data; and
at a second time subsequent to the first time, provide at least a second portion of the first log data and at least a second portion of the device data to the second service for generation of a second output based on the first log data.

2. The system of claim 1, further comprising computer-executable instructions to:
determine, based on the device data, a sampling rate for processing of the at least a first portion of the first log data by the first service to determine the first output; and
determine a size of the at least a first portion of the first log data based on the sampling rate, wherein the at least a first portion of the first log data provided to the first service includes a quantity of data based on the size.

3. The system of claim 1, further comprising computer-executable instructions to:
receive, from the first service, an indication of one or more characteristics of the at least a first portion of the first log data used by the first service to determine the first output;
determine a set of sampling parameters for the first service based on the one or more characteristics, wherein the set of sampling parameters include one or more of: a sampling rate or a type of data;
receive second log data from the computing device;
determine, based on the set of sampling parameters, a portion of the second log data; and
at a third time subsequent to the second time, provide the portion of the second log data to the first service.

4. A method comprising:
receiving, by a first device, first data;
storing the first data in a volatile memory device associated with the first device;
determining priority data indicative of: a first priority value for a first service executing on a computing device and a second priority value for a second service executing on a computing device, wherein the first priority value indicates a greater priority than the second priority value;
determining device data indicative of one or more of: a first transfer rate at which data is received by the first device; a second transfer rate at which data is transmitted from the first device to one or more second devices; a quantity of unused memory associated with the first device; or a quantity of computational resources used by the first device;
based on the priority data and the device data, determining a first set of data parameters for providing a first portion of the first data to the first service at a first time and a second set of data parameters for providing a second portion of the first data to the second service at a second time subsequent to the first time; and providing the first portion of the first data to the first service.

5. The method of claim 4, wherein the first device further includes a non-volatile memory device, and a first data transfer rate associated with the volatile memory device differs from a second data transfer rate associated with the non-volatile memory device.

6. The method of claim 4, further comprising:
providing a file system in the volatile memory device; and
receiving from an application, an instruction to write the first data to the file system, wherein the first data is stored in the volatile memory device in response to the instruction.

7. The method of claim 4, wherein the first set of data parameters includes one or more of:
the first time to provide the first portion of the first data to the first service;
a sampling rate for providing the first data to the first service;
a quantity of the first data to include in the first portion; or
one or more characteristics of the first data to include in the first portion.

8. The method of claim 4, further comprising:
determining, based on the first transfer rate and the second transfer rate, a sampling rate for providing the first portion of the first data to the first service.

9. The method of claim 4, further comprising:
providing at least a portion of the device data to the first service; and
receiving, from the first service, an indication of a first sampling rate for providing the first data to the first service, wherein the first portion of the first data is determined based on the indication.

10. The method of claim 4, further comprising:
receiving, from the first service, an indication of one or more characteristics of the first portion of the first data processed by the first service;
determining a set of sampling parameters based on the indication of the one or more characteristics, wherein the set of sampling parameters include one or more of a sampling rate or a type of data;
receiving, by the first device, second data;
determining, based on the set of sampling parameters, a portion of the second data; and
providing, to the first service, the portion of the second data.

11. The method of claim 4, further comprising:
determining, based on the device data one or more of:
the first transfer rate exceeds the second transfer rate;
the quantity of unused memory associated with the first device is less than a threshold quantity of unused memory; or
the quantity of computational resources used by the first device exceeds a threshold quantity of computational resources; and
in response to the device data and in response to the second priority value being less than the first priority value, denying access to the first data to the second service.

12. The method of claim 4 further comprising:
receiving, from the first service, a first indication that a first output was generated based on the first data;
providing the second portion of the first data to the second service;
receiving, from the second service, a second indication that a second output was generated based on the first data;
determining one or more of: unused memory associated with a non-volatile memory device, or computational resources used to store the first data on the non-volatile memory device;
based on the one or more of the unused memory or the computational resources, determine a third portion of the first data for storage; and
in response to the first indication and the second indication, storing the third portion of the first data on the non-volatile memory device.

13. A system comprising:
one or more memories storing computer-executable instructions; and
one or more hardware processors to execute the computer-executable instructions to:
receive, using a file system, first data from an application, wherein in response to an instruction from the application to store the first data in a non-volatile memory device, the file system stores the first data in a volatile memory device of the one or more memories;
determine device data indicative of one or more of:
a first transfer rate at which the first data is received;
a second transfer rate at which the first data is transmitted to one or more computing devices;
a quantity of unused memory associated with the one or more memories; or
a quantity of computational resources used by the one or more hardware processors;
based on the device data, determine a first quantity of the first data to be provided to one or more services;
provide the first quantity of the first data to a first service of the one or more services, wherein the first service is executing on a computing device; and
based on the device data, determine a second quantity of the first data to be provided to a second service of the one or more services, wherein the second service is executing on a computing device, and the second quantity differs from the first quantity.

14. The system of claim 13, further comprising computer-executable instructions to:
determine a first priority value associated with the first service and a second priority value associated with the second service; and
determine, based on the first priority value exceeding the second priority value, a first time associated with transmission of the first data to the first service that is prior to a second time associated with transmission of the first data to the second service.

15. The system of claim 13, further comprising computer-executable instructions to:
determine priority data indicative of a first priority value for the first service and a second priority value for the second service, wherein the first priority value indicates a greater priority than the second priority value; and
based on the priority data, determine a first set of data parameters for providing the first data to the first service, wherein the first set of data parameters includes one or more of: a first time to provide the first quantity of the first data to the first service; a sampling rate for providing the first data to the first service; a size of the first quantity of the first data; or one or more characteristics of the first data to include in the first quantity.

16. The system of claim 13, further comprising computer-executable instructions to:
provide at least a portion of the device data to the first service;
receive an indication of a sampling rate from the first service; and
determine the first quantity of the first data based on the sampling rate.

17. The system of claim 13, further comprising computer-executable instructions to:
receive, from the first service, an indication of a portion of the first quantity of the first data that was processed by the first service;
determine, based on the indication, a set of sampling parameters associated with the first service, wherein the set of sampling parameters include one or more of a sampling rate or a type of data;
receive second data;
determine, based on the set of sampling parameters, a third quantity of the second data; and
provide, to the first service, the third quantity of the second data.

18. The system of claim 13, further comprising computer-executable instructions to:
determine one or more of: a quantity of unused data storage associated with the non-volatile memory device, computational resources used to access the non-volatile memory device, or one or more rules associated with storage of the first data;
based on the one or more of the quantity, the computational resources, or the one or more rules, determine a third quantity of the first data; and
store the third quantity of the first data on the non-volatile memory device.

19. The system of claim 18, further comprising computer-executable instructions to:
receive, from the first service, an indication that a first output was generated based on the first data; and
in response to the indication, store the second quantity of the first data on the non-volatile memory device.

20. The system of claim 13, further comprising computer-executable instructions to:
in response to receiving the first data, access configuration data that indicates a first set of data parameters associated with providing the first data to the first service and a second set of data parameters associated with providing the first data to the second service; and
based on the configuration data, determine one or more first characteristics of the first data to include in the first quantity and one or more second characteristics of the first data to include in the second quantity.

* * * * *